United States Patent
Lin et al.

(10) Patent No.: US 6,951,159 B2
(45) Date of Patent: Oct. 4, 2005

(54) MULTI-FUNCTIONAL TRIMMING APPARATUS

(75) Inventors: Hsiao-Ying Lin, Taipei (TW); Kris Gustaaf Marguerite Verstockt, Taipei (TW); Tzu-Feng Tseng, Taipei (TW)

(73) Assignee: Primax Electronics, Ltd. (TW)

( * ) Notice: Subject to any disclaimer, the term of this patent is extended or adjusted under 35 U.S.C. 154(b) by 376 days.

(21) Appl. No.: 10/244,776

(22) Filed: Sep. 16, 2002

(65) Prior Publication Data

US 2003/0182807 A1 Oct. 2, 2003

(30) Foreign Application Priority Data

Mar. 28, 2002 (TW) .......................................... 9110621 A (51) Int. Cl.[7] .............................. B26D 5/10; B26D 7/26
(52) U.S. Cl. .......................................... 83/620; 83/614
(58) Field of Search .......................... 83/614, 618, 619, 83/620, 621, 622

(56) References Cited

U.S. PATENT DOCUMENTS

| | | | | |
|---|---|---|---|---|
| 5,322,001 A | * | 6/1994 | Boda | ........................ 83/614 X |
| 5,802,942 A | * | 9/1998 | Cornell et al. | ............ 83/614 X |
| 6,098,515 A | * | 8/2000 | Daley, Jr. | ................. 83/614 X |
| 6,209,434 B1 | * | 4/2001 | Kim et al. | ................ 83/620 X |
| 6,460,443 B1 | * | 10/2002 | Hsiao | ........................... 83/614 |
| 2003/0029291 A1 | * | 2/2003 | Lin | .............................. 83/620 |

* cited by examiner

Primary Examiner—Charles Goodman
(74) Attorney, Agent, or Firm—Madson & Metcalf (57) ABSTRACT

A trimming apparatus for variously trimming a sheet material is disclosed. The trimming apparatus includes a base for placing the sheet material thereon, a rail mounted on the base, a first trimming element for trimming the sheet material in a first manner, a second trimming element for trimming the sheet material in a second manner, a carriage movably engaging with the rail, having a first and a second portions coupled to the first and second trimming elements, respectively, and having a third portion for being exerted thereon a driving force to move along the rail, thereby carrying a selected one of the first and second trimming elements to cross over the sheet material.

20 Claims, 8 Drawing Sheets

MULTI-FUNCTIONAL TRIMMING APPARATUS

FIELD OF THE INVENTION

The present invention relates to a trimming apparatus, and more particularly to a multi-functional trimming apparatus to optionally impart a complete or intermittent cut line or a folding line to a paper or a sheet material so that the resulting paper or sheet material can be divided or tore apart or folded easily along the cut line.

BACKGROUND OF THE INVENTION

Figure 1:
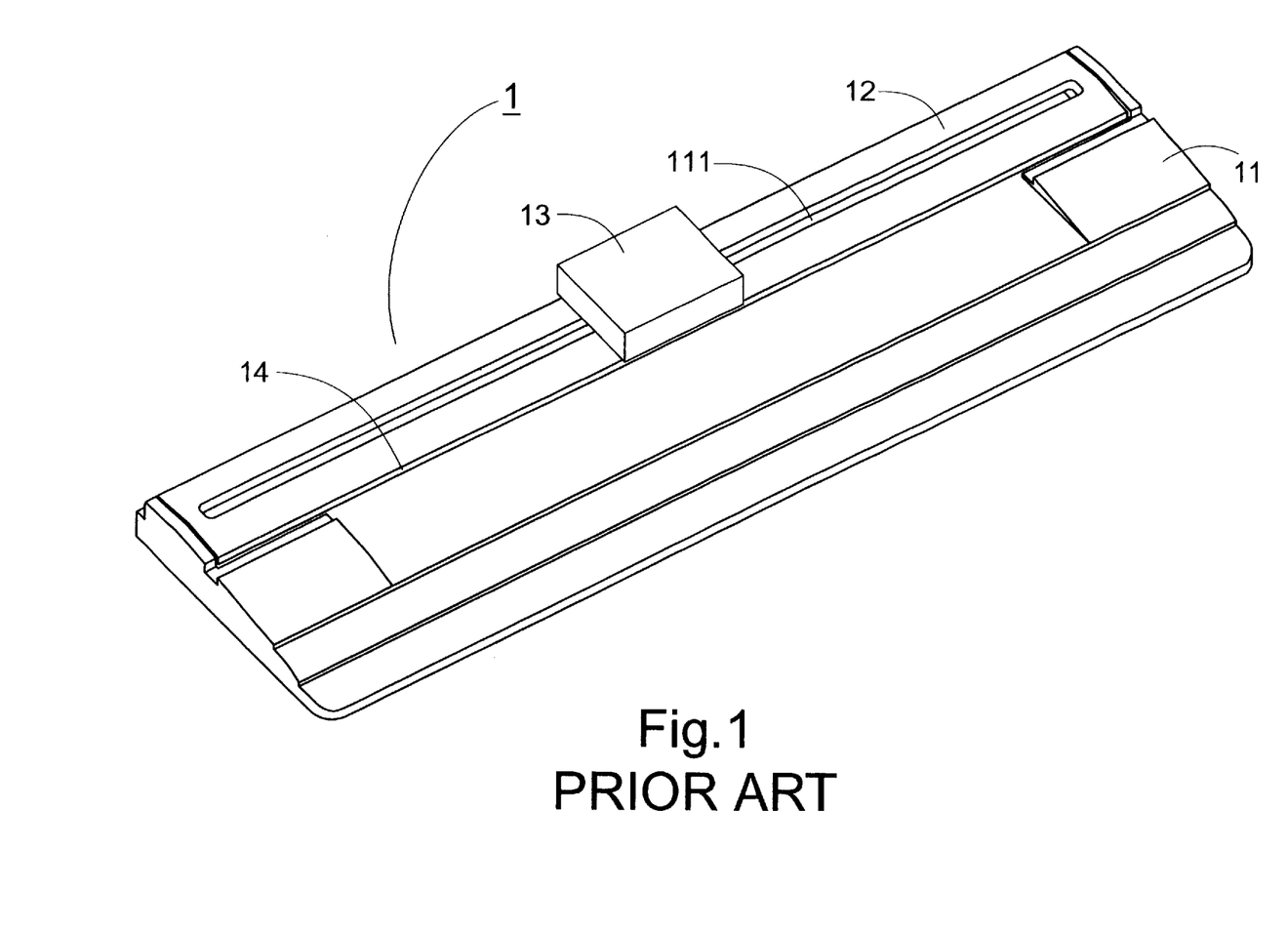
FIG. 1 is a schematic diagram illustrating the appearance of a conventional paper cutter.

As is well known, a paper cutter is a trimming apparatus for efficiently cutting paper into small sheets. Please refer to FIG. 1 which is a schematic diagram illustrating the appearance of a conventional paper cutter. The paper cutter 1 includes a base 11, a slide rail 12 and a slidable blade holder 13. The base 11 is used for placing a sheet of paper to be cut thereon. The slide rail 12 is fixed on the base 11 and defines a guiding slit 111 therein for the slidable blade holder 13 to slide therealong. When the paper (not shown) is put into a gap 14 between the slide rail 12 and base 11, the user may press down the slide rail to have the blade (not shown) of the slidable holder 13 sustain against the paper. By sliding the slidable holder 13 along the guiding slit 111, the paper is cut into two pieces.

The paper cutter mentioned above is specifically used to divide the paper completely. For the case that paper intermittently cut to be easily torn off with hand later or paper marked with a folding line to be easily folded with hand is required, another kind of trimmer will be needed for that specific requirement. Thus, it is cost- and space-inefficient.

Therefore, the purpose of the present invention is to develop a multi-functional trimming apparatus to deal with the above situations encountered in the prior art.

SUMMARY OF THE INVENTION

An object of the present invention is to provide a multi-functional trimming apparatus for optionally trimming paper or any other cutable sheet material in different trimming ways.

Another object of the present invention is to provide a blade carriage for use with a trimming apparatus. The blade carriage accommodates therein a variety of trimming tools optionally provided for the trimming apparatus to perform various trimming functions.

According to an aspect of the present invention, there is provided a trimming apparatus for variously trimming a sheet material. The trimming apparatus includes a base for placing the sheet material thereon, a rail mounted on the base, a first trimming element for trimming the sheet material in a first manner, a second trimming element for trimming the sheet material in a second manner, a carriage movably engaging with the rail, having a first and a second portions coupled to the first and second trimming elements, respectively, and having a third portion for being exerted thereon a driving force to move along the rail, thereby carrying a selected one of the first and second trimming elements to cross over the sheet material.

For example, the sheet material can be paper or cloth or any other suitable sheet material such as a metal foil.

In an embodiment, the first trimming element is a sharp blade and the first manner is complete cutting. The second trimming element is a gear-shaped blade and the second manner is intermittent cutting.

In another embodiment, the first trimming element is a sharp blade and the first manner is complete cutting, and the second trimming element is a blunt blade and the second manner is folding-line making.

Preferably, the trimming apparatus further includes a third trimming element coupled to a fourth portion of the carriage for trimming the sheet material in a third manner in response to the movement of the carriage. For example, the three trimming elements can be a sharp blade, a gear-shaped blade and a blunt blade.

According to another aspect of the present invention, there is provided a trimming apparatus for variously trimming a sheet material. The trimming apparatus includes a base for placing the sheet material thereon, a rail mounted on the base, a carriage having a receptacle and movably engaging with the rail to have the sheet material cut in a desired manner, and a plurality of trimming elements with different trimming functions, disposed in the receptacle of the carriage, and selected to be in contact with the sheet material by manipulating the carriage.

Preferably, the carriage includes a top cover having therein a plurality of sustaining elements corresponding to the plurality of trimming elements, respectively, and a housing cooperating with the top cover to define the receptacle and having a plurality of grooves for accommodating the trimming elements, respectively. Each of the grooves has an opening for allowing a selected one of the trimming elements to protrude therefrom in response to a sustaining force of a corresponding one of the sustaining elements.

In an embodiment, the carriage is manipulated by rotating the top cover relative to the housing to align the corresponding one of the sustaining elements with the selected one of the trimming elements to provide the sustaining force for the selected trimming element.

Preferably, the carriage further includes a plurality of holding elements for holding the trimming elements, disposed in the grooves of the housing, respectively, and optionally moving down to expose the selected trimming element from a corresponding one of the openings by being exerted thereon the sustaining force, and a plurality of elastic elements disposed in the grooves and arranged between the holding elements and the openings, respectively, for providing an elastic force to retract the holding elements with the trimming elements which are not exerted thereon the sustaining force back to the receptacle.

Preferably, the sustaining elements include a first sustaining element located at a first side of the carriage, and having a rising incline ending at a first peak in a specific direction, a second sustaining element disposed at a second side opposite to the first side, and having a falling incline beginning with a second peak in the specific direction, and a third sustaining element consisting of a pair of sustaining blocks symmetrically disposed between the first and second sides, each of the sustaining blocks having an intermediate peak portion and two lateral incline portions. The positions of the first peak of the first sustaining element, the second peak of the second sustaining element, and the peak portions of the third sustaining element are arranged to sustain respective holding elements at different time points while rotating the top cover, thereby pushing essentially one of the trimming elements out of the corresponding one of the openings at one time.

Preferably, the trimming elements include a first blade having a sharp portion for trimming the sheet material to have a complete cut line while moving cross the sheet material, a second blade having a gear-shaped blade including sharp teeth at an equidistant interval for trimming the sheet material to have an intermittent cut line while rolling cross the sheet material, and a third blade having a blunt portion for trimming the sheet material to have a folding line while moving cross the sheet material.

Preferably, the top cover and the housing are both of a circular shape, and the grooves are aligned along a diameter of the housing.

For example, the specific direction can be clockwise or counterclockwise.

According to a further aspect of the present invention, there is provided a carriage for use with a trimming apparatus for carrying a selected trimming element to cross over a sheet material to have a trimming line. The carriage includes a top cover having a sustaining device therein, and a housing accommodating therein at least two holding elements for holding a first and a second trimming elements, wherein one of the first and second trimming elements is pushed out of the housing by the sustaining device to serve as the selected trimming element according to a desired trimming way.

Preferably, the first trimming element is a sharp blade for trimming the sheet material to have a complete cut line. The second trimming element is preferably one of a gear-shaped blade and a blunt blade for trimming the sheet material to have one of an intermittent cut line and a folding line, respectively.

In an embodiment, the carriage further includes a first and a second holding elements for holding the first and second trimming elements, respectively, and optionally moving down to expose the selected trimming element in response to a sustaining force of the sustaining device. Preferably, the sustaining device include a first sustaining element located at a first side of the carriage, and having a rising incline ending at a first peak in a specific direction, and a second sustaining element disposed at a second side opposite to the first side, and having a falling incline beginning with a second peak in the specific direction. The first and second holding elements are optionally pushed outwards by the first and second peaks at different time points by rotating the top cover relative to the housing.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
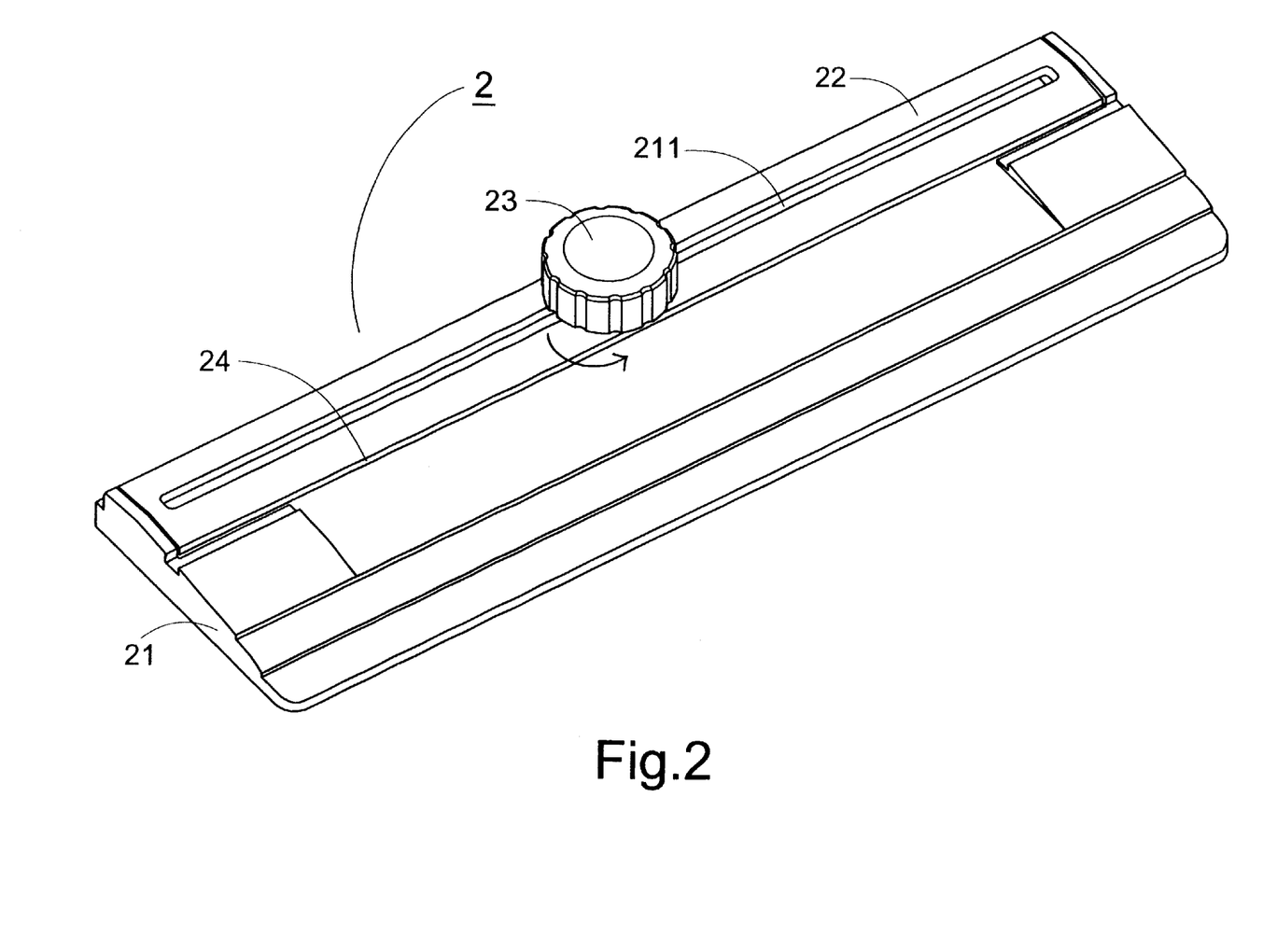
FIG. 2 is a schematic diagram illustrating the appearance of a preferred embodiment of a paper trimmer according to the present invention.

Please refer to FIG. 2 which is a schematic diagram illustrating the appearance of a preferred embodiment of a paper trimmer according to the present invention. The paper trimmer 2 includes a base 21, a rail 22 and a rotatable carriage 23 accommodate therein three trimming elements (not shown in this figure), and allowing only a selected one of the trimming elements to expose from the carriage 23 to work. The base 21 is used for placing a paper to be trimmed thereon. The rail 22 is mounted on the base 21. A gap 24 is existent between the base 21 and the rail 22 for entering therefrom and fixing therein the paper. The rail 22 has a guiding slit 211 for the carriage 23 engaging therewith to slide therealong. When the carriage 23 slides in the guiding slit 211, the three trimming elements are moved along with the carriage, and the exposed trimming element crosses over and thus trims the paper in a desired way.

Figure 3:
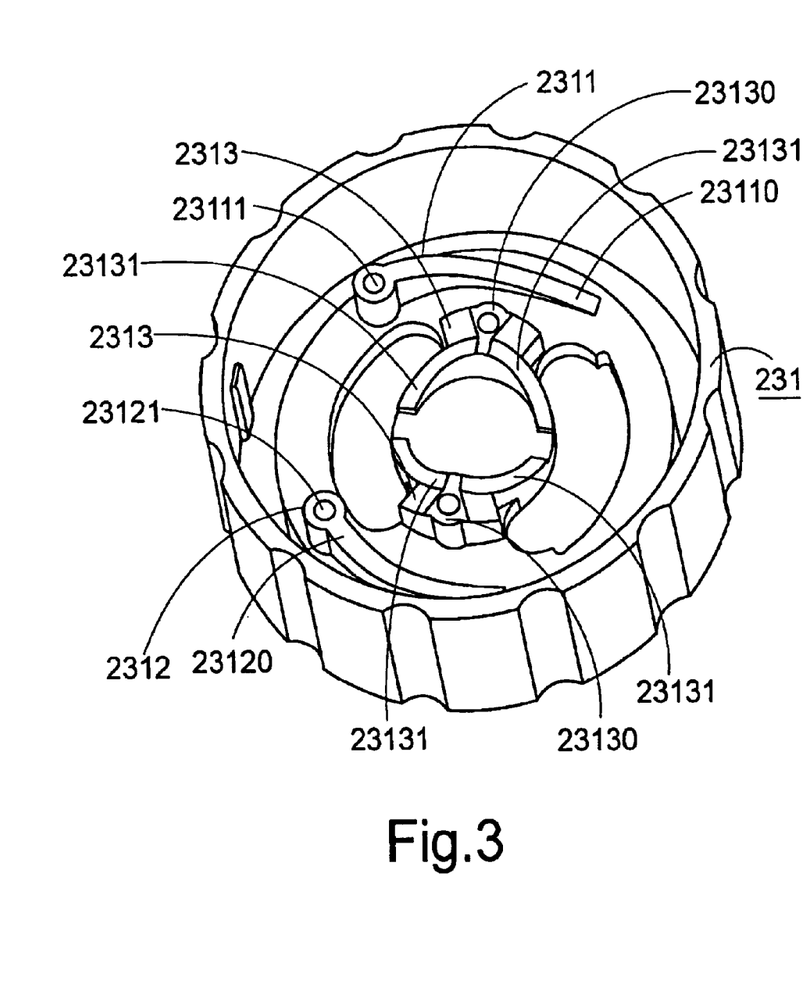
FIG. 3 is a schematic diagram illustrating an inner structure of an upper part of the carriage of FIG. 2.

Please refer to FIG. 3 which is a schematic diagram illustrating an inner structure of an upper part of the carriage of FIG. 2. The upper part of the carriage, as is called a top cover 231 in this embodiment, has a first sustaining element 2311, a second sustaining element 2312 and a pair of sustaining blocks 2313 therebetween. As shown in FIG. 3, the first sustaining element 2311 located at the first side of the top cover 231 has a rising incline 23110 ending at a peak 23121 in the counterclockwise direction, while the second sustaining element 2312 located at the second side opposite to the first side has a falling incline 23120 beginning with a peak 23111 in the counterclockwise direction. The pair of sustaining blocks 2313 is symmetrically disposed between the first and second sides of the top cover 231. Each of the sustaining blocks 2313 has an intermediate peak portion 23130 and two lateral incline portions 23131.

Figure 4:
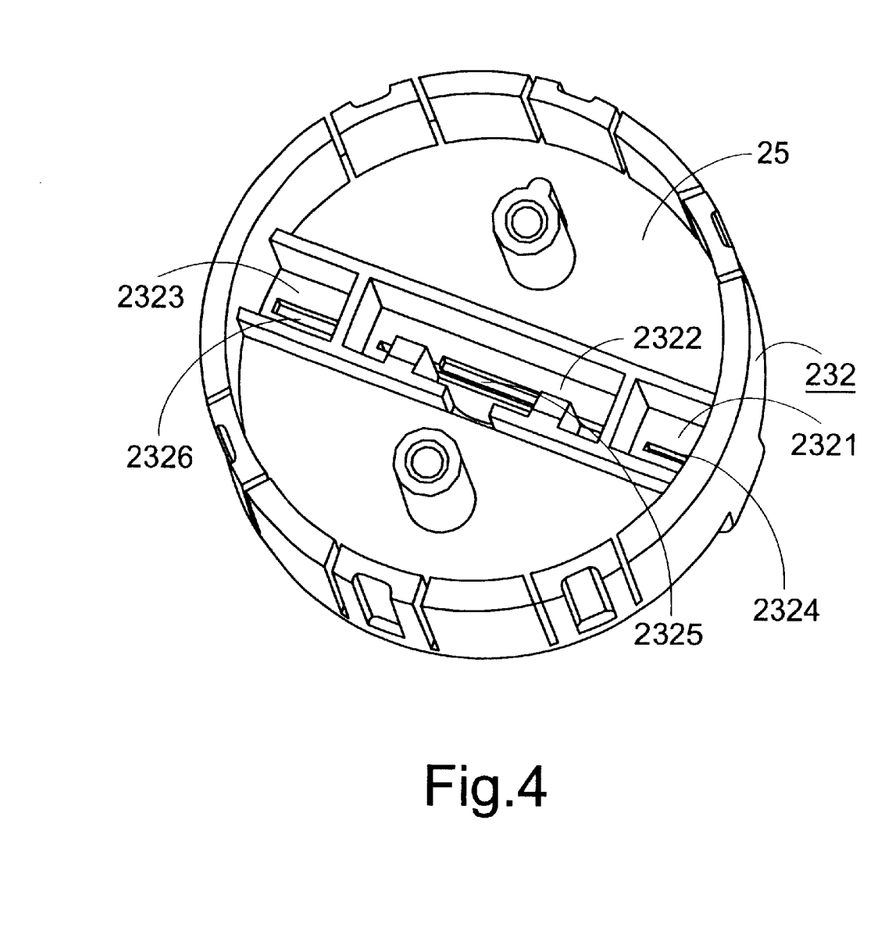
FIG. 4 is a schematic diagram illustrating an inner structure of a lower part of the carriage of FIG. 2.

Please refer to FIG. 4 which is a schematic diagram illustrating an inner part of a lower part of the carriage of FIG. 2. The lower part of the carriage, as is called a housing 232 in this embodiment, includes three grooves 2321, 2322 and 2323 and each of the grooves has an opening in the bottom, i.e. the openings 2324, 2325 and 2326. The grooves 2321, 2322 and 2323 are aligned with one another along the diameter of the housing 232.

Figure 5A:
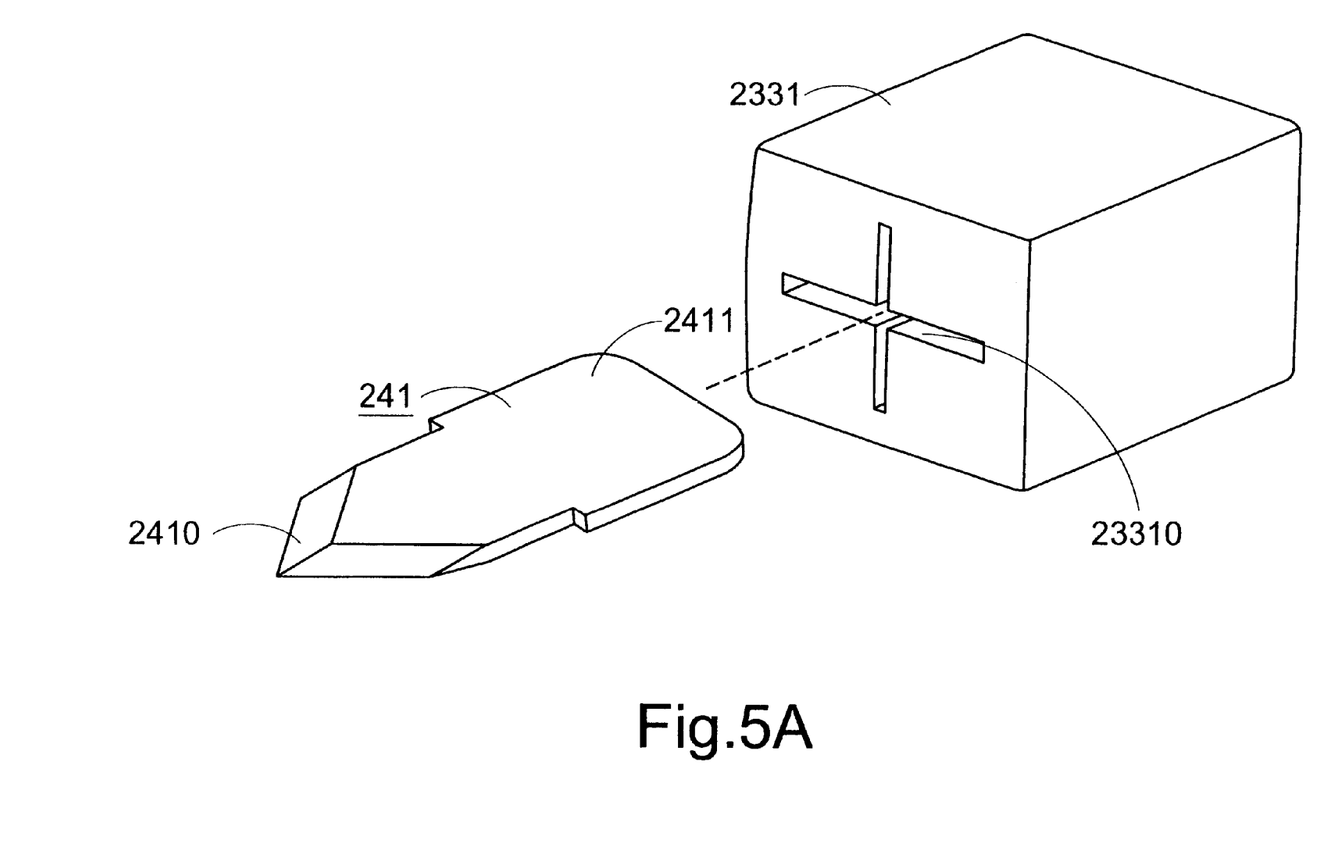
FIGS. 5A–5C are schematic resolving diagrams exemplifying three trimming elements and their corresponding holding elements, respectively.
Figure 5B:
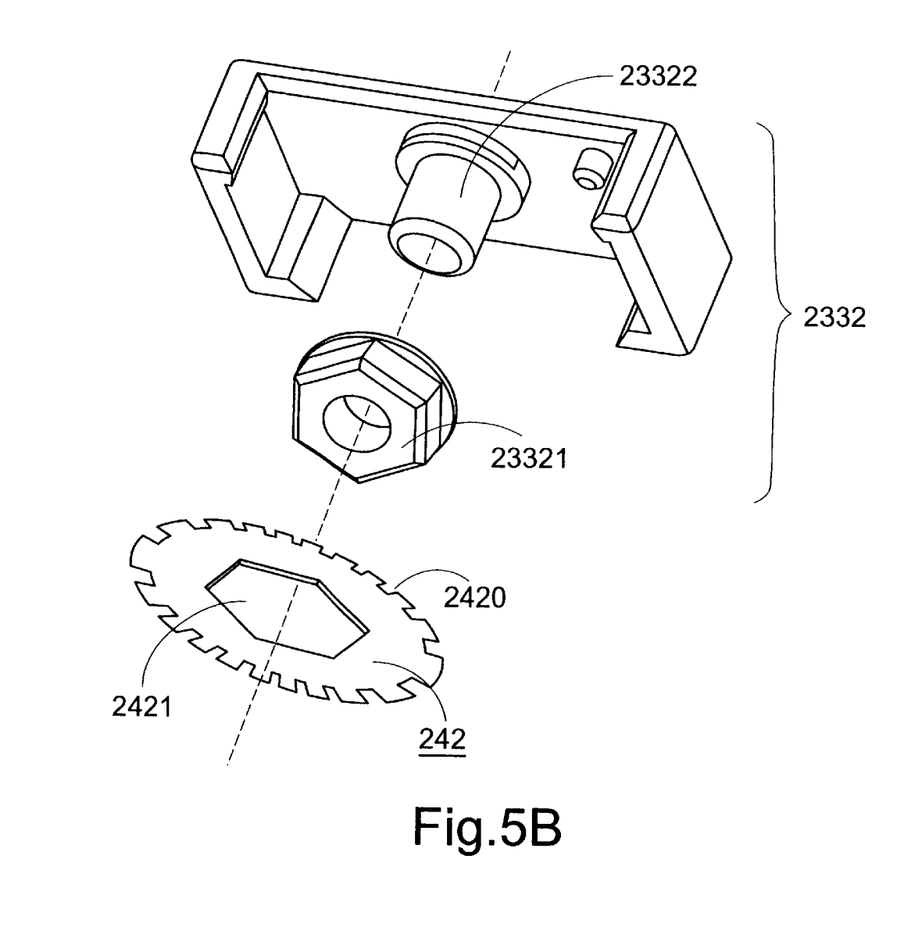
Figure 5C:
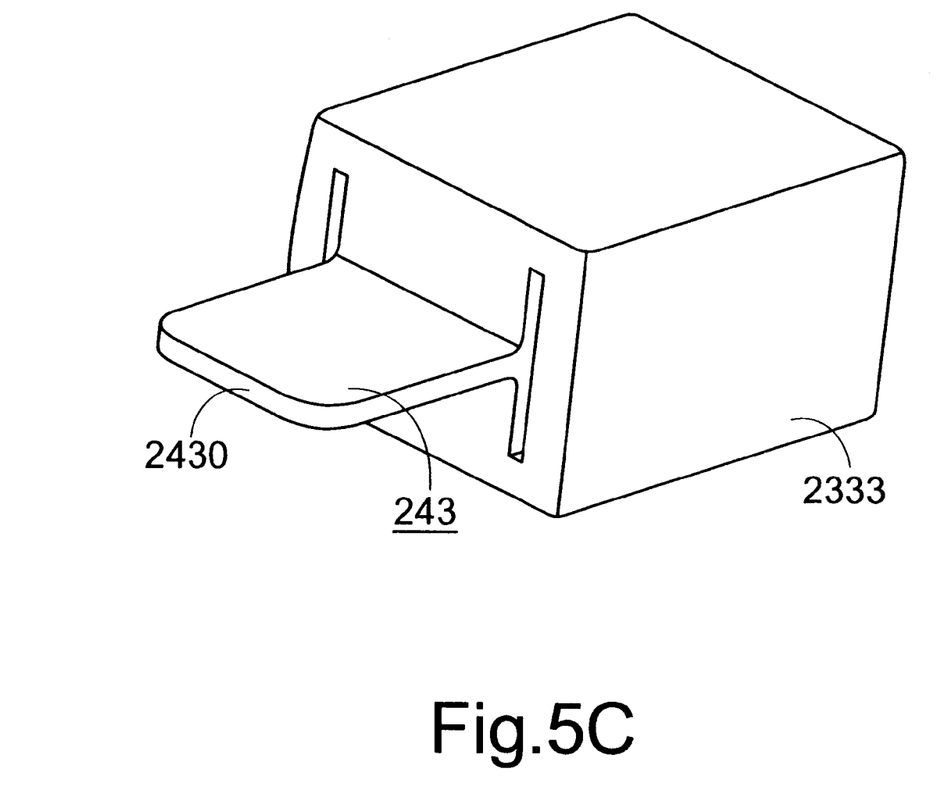

FIGS. 5A–5C are schematic resolving diagrams exemplifying three trimming elements and their corresponding holding elements, respectively. The housing 232 in FIG. 4 cooperates with the top cover 231 in FIG. 3 to define a receptacle 25 for accommodating three sets of trimming elements, holding elements and elastic elements. In this embodiment, the trimming elements include a sharp blade 241 for cutting the paper completely, a gear-shaped blade 242 for giving an intermittent cut line to the paper and a blunt blade 243 for giving a non-cut folding line to the paper. For holding these trimming elements, three holding elements 2331, 2332 and 2333 are provided, respectively. The holding elements 2331, 2332 and 2333 are used for holding different trimming elements to provide different trimming functions. As shown in FIG. 5A, the sharp blade 241 has a leading sharp portion 2410 to be in contact with the trimmed paper, and a back portion to be inserted into a slit 23310 of the holding element 2331 so as to be held by the holding element 2331. Please refer to FIG. 5B, the gear-shaped blade 242 includes teeth portions 2420 arranged at an equidistant interval to be in contact with the trimmed paper, and a central hole 2421 to be rotatably sleeved on a base post 23322 of the holding element 2322 via an intermediate transmitting element 23321 of the holding element 2322. The blunt blade 243, as shown in FIG. 5C, has a blunt portion 2430 to be in contact with the trimmed paper integrally formed with the holding element 2333.

Figure 6:
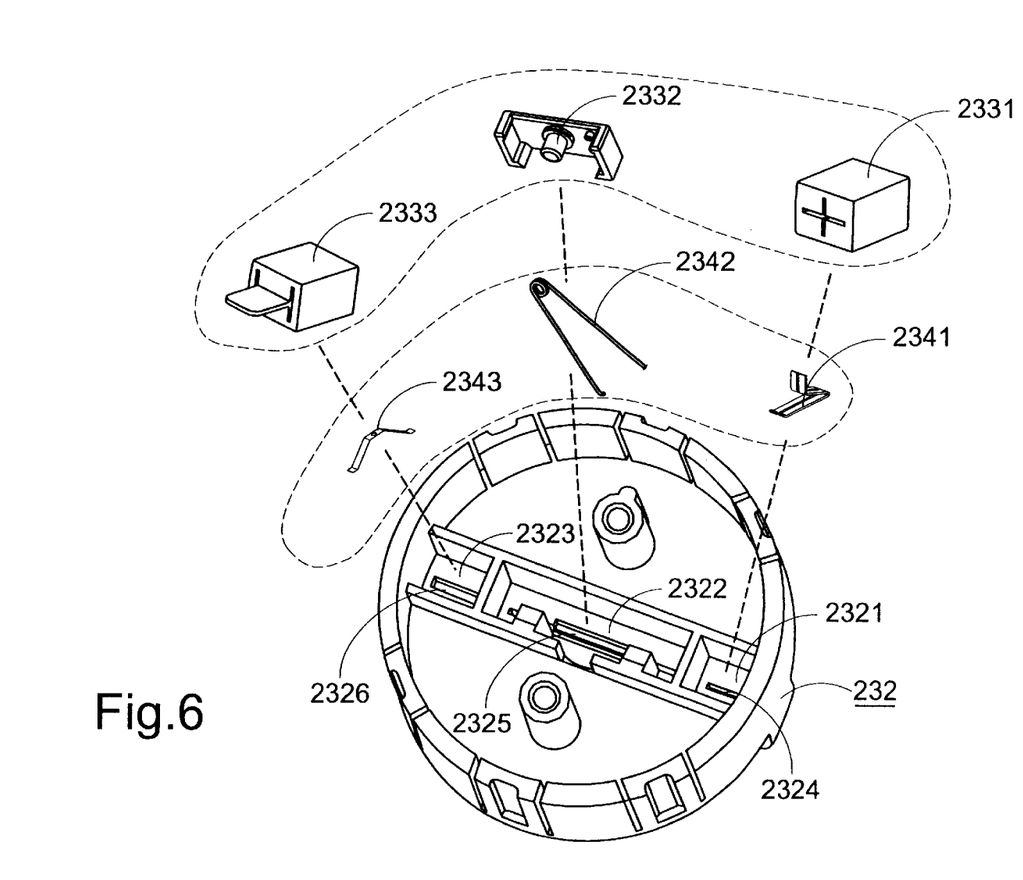
FIG. 6 is a schematic diagram illustrating three elastic elements corresponding to the three holding elements of FIGS. 5A–5C, respectively, for optionally retracting the unselected trimming elements.

The functions of the above elements are described with reference to FIG. 6 which further illustrates three elastic elements corresponding to the three holding elements of FIGS. 5A~5C, respectively, for optionally retracting the unselected trimming elements. First of all, the elastic elements 2341, 2342 and 2343 are placed into the grooves 2321, 2322 and 2323 of the housing 232. The holding elements 2331, 2332 and 2333 are disposed in the grooves 2321, 2322 and 2323 of the housing 232, too, above the elastic elements 2341, 2342 and 2343 by orienting the blade portions 2410, 2420 and 2430 (FIG. 5A~5C) of the trimming elements 241, 242 and 243 toward the openings 2324, 2325 and 2326, respectively. In order to clearly distinguish the different holding elements, it should be noted that all the holding elements and the elastic elements in FIG. 6 are not shown as they should be oriented. Further, the elements 23321 and 242 are not shown in FIG. 6 and have to be referred to FIG. 5B.

When the top cover 231 is rotated one cycle relative to the housing 232, the first and second sustaining elements 2311 and 2312 and the pair of sustaining blocks 2313 of the top cover 231 sustain the holding elements 2331, 2333 and 2332 at different time points, thereby pushing only a selected one of the blade portions 2410, 2420 and 2430 out of the corresponding opening 2324, 2325 or 2326 at one time. For example, when the user likes to cut the paper completely, the top cover 231 is rotated counterclockwise to have the holding element 2331 climb the incline 23110 of the first sustaining element 2311 up to the peak 23111. Due to the presence of the elastic element 2341, the sustaining element 2311 will sustain against the holding element 2331 all the time. When the holding element 2331 reaches the peak 23111 of the sustaining element 2311, the sharp blade 241 held by the holding element 2331 will be pushed out of the opening 2324. At the moment, the holding element 2333 with the blunt blade 243 is rotated to go down the incline 23120 from the peak 23121, and thus the blade 243 is retracted back to receptacle 25 by the elastic force provided by the elastic element 2343, and will not expose from the opening 2326. Meanwhile, the peaks 23130 of the sustaining blocks 2313 will temporarily sustain against and then slip away from the corresponding holding element 2332 via the lateral inclines 23131, so the gear-shaped blade 242 will not protrude from the opening 2325 finally due to the retracting force of the elastic element 2342. In other words, there is only one trimming element, i.e. the sharp blade 241, protruding downwards from the lower part 232 of the carriage 23 to be in contact with the paper on the base 21. Then, by sliding the carriage 23 along the guiding slit 211, the sharp blade 241 is carried to cross over the paper, and cut it into two pieces. Similarly, when a folding line is desired, the blunt blade 243 is selected to be used by rotating the top cover 231 clockwise relative to the housing 232. When the holding element 2333 reaches the peak 23121 along the incline 23120, the blunt blade 243 will be pushed out of the opening 2326 to serve as the working blade. Therefore, the desired folding line can be given to the trimmed paper by moving the carriage 23 along the guide slit 211. Further, when the user likes the paper to have an intermittent cut line, the gear-shaped blade 242 is selected by rotating the top cover 231 relative to the housing 232 clockwise from the first situation or counterclockwise from the second situation mentioned above until the peaks 23130 of the sustaining blocks 2313 are aligned with the holding element 2332. The peak portions 23130 pushes the teeth portion 2420 of the gear-shaped blade 242 partially out of the opening 2325 to be in contact with the paper. When the carriage 23 is moved along the guiding slit 211, the gear-shaped blade 242 rotates about the post 23322 to roll over the paper, thereby trimming the paper in the desired intermittently cut way. Accordingly, the trimming apparatus can optionally provides a complete or intermittent cut line or a folding line to paper so that the resulting paper can be divided or tore apart or folded easily along the cut line.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A trimming apparatus for variously trimming a sheet material, comprising:
    a base for placing said sheet material thereon;
    a rail mounted on said base;
    a first trimming element for trimming said sheet material in a first manner;
    a second trimming element for trimming said sheet material in a second manner;
    a carriage movably engaging with said rail, having a first and a second portions coupled to said first and second trimming elements, respectively, and having a third portion for being exerted thereon a driving force to move along said rail, thereby carrying a selected one of said first and second trimming elements to cross over said sheet material.

2. The trimming apparatus according to claim 1 wherein said sheet material is one of paper and cloth.

3. The trimming apparatus according to claim 1 wherein said first trimming element is a sharp blade and said first manner is complete cutting.

4. The trimming apparatus according to claim 3 wherein said second trimming element is a gear-shaped blade and said second manner is intermittent cutting.

5. The trimming apparatus according to claim 3 wherein said second trimming element is a blunt blade and said second manner is folding-line making.

6. The trimming apparatus according to claim 1 further comprising a third trimming element coupled to a fourth portion of said carriage for trimming said sheet material in a third manner in response to the movement of said carriage.

7. The trimming apparatus according to claim 6 wherein said third trimming element is selected from a group consisting of a sharp blade, a gear-shaped blade and a blunt blade.

8. A trimming apparatus for variously trimming a sheet material, comprising:
    a base for placing said sheet material thereon;
    a rail mounted on said base;
    a carriage having a receptacle and movably engaging with said rail to have said sheet material cut in a desired manner; and
    a plurality of trimming elements with different trimming functions, disposed in said receptacle of said carriage, and selected to be in contact with said sheet material by manipulating said carriage.

9. The trimming apparatus according to claim 8 wherein said carriage comprises:
   a top cover having therein a plurality of sustaining elements corresponding to said plurality of trimming elements, respectively; and
   a housing cooperating with said top cover to define said receptacle and having a plurality of grooves for accommodating said trimming elements, respectively, each of said grooves having an opening for allowing a selected one of said trimming elements to protrude therefrom in response to a sustaining force of a corresponding one of said sustaining elements.

10. The trimming apparatus according to claim 9 wherein said carriage is manipulated by rotating said top cover relative to said housing to align said corresponding one of said sustaining elements with said selected one of said trimming elements to provide said sustaining force for said selected trimming element.

11. The trimming apparatus according to claim 10 wherein said carriage further comprises:
   a plurality of holding elements for holding said trimming elements, disposed in said grooves of said housing, respectively, and optionally moving down to expose said selected trimming element from a corresponding one of said openings by being exerted thereon said sustaining force; and
   a plurality of elastic elements disposed in said grooves and arranged between said holding elements and said openings, respectively, for providing an elastic force to retract said holding elements with said trimming elements which are not exerted thereon said sustaining force back to said receptacle.

12. The trimming apparatus according to claim 11 wherein said sustaining elements include:
   a first sustaining element located at a first side of said carriage, and having a rising incline ending at a first peak in a specific direction;
   a second sustaining element disposed at a second side opposite to said first side, and having a falling incline beginning with a second peak in said specific direction; and
   a third sustaining element consisting of a pair of sustaining blocks symmetrically disposed between said first and second sides, each of said sustaining blocks having an intermediate peak portion and two lateral incline portions;
   wherein the positions of said first peak of said first sustaining element, said second peak of said second sustaining element, and said peak portions of said third sustaining element are arranged to sustain respective holding elements at different time points while rotating said top cover, thereby pushing essentially one of said trimming elements out of said corresponding one of said openings at one time.

13. The trimming apparatus according to claim 12 wherein said trimming elements include:
   a first blade having a sharp portion for trimming said sheet material to have a complete cut line while moving cross said sheet material;
   a second blade having a gear-shaped blade including sharp teeth at an equidistant interval for trimming said sheet material to have an intermittent cut line while rolling cross said sheet material; and
   a third blade having a blunt portion for trimming said sheet material to have a folding line while moving cross said sheet material.

14. The trimming apparatus according to claim 13 wherein said top cover and said housing are both of a circular shape, and said grooves are aligned along a diameter of said housing.

15. The trimming apparatus according to claim 14 wherein said specific direction is clockwise or counterclockwise.

16. A carriage for use with a trimming apparatus for carrying a selected trimming element to cross over a sheet material to have a trimming line, comprising:
   a top cover having a sustaining device therein; and
   a housing accommodating therein at least two holding elements for holding a first and a second trimming elements;
   wherein one of said first and second trimming elements is pushed out of said housing by said sustaining device to serve as said selected trimming element according to a desired trimming way.

17. The carriage according to claim 16 wherein said first trimming element is a sharp blade for trimming said sheet material to have a complete cut line.

18. The carriage according to claim 17 wherein said second trimming element is one of a gear-shaped blade and a blunt blade for trimming said sheet material to have one of an intermittent cut line and a folding line, respectively.

19. The carriage according to claim 18 wherein said carriage further comprises a first and a second holding elements for holding said first and second trimming elements, respectively, and optionally moving down to expose said selected trimming element in response to a sustaining force of said sustaining device.

20. The carriage according to claim 19 wherein said sustaining device includes:
   a first sustaining element located at a first side of said carriage, and having a rising incline ending at a first peak in a specific direction; and
   a second sustaining element disposed at a second side opposite to said first side, and having a falling incline beginning with a second peak in said specific direction;
   wherein said first and second holding elements are optionally pushed outwards by said first and second peaks at different time points by rotating said top cover relative to said housing.

* * * * *